United States Patent
Sugiyama et al.

(10) Patent No.: US 8,490,131 B2
(45) Date of Patent: Jul. 16, 2013

(54) AUTOMATIC CAPTURE OF DATA FOR ACQUISITION OF METADATA

(75) Inventors: Nobukazu Sugiyama, San Diego, CA (US); Jaime Chee, San Diego, CA (US); Ted Dunn, Carlsbad, CA (US); Utkarsh Pandya, San Diego, CA (US); Ling Jun Wong, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 841 days.

(21) Appl. No.: 12/590,259

(22) Filed: Nov. 5, 2009

(65) Prior Publication Data

US 2011/0102684 A1 May 5, 2011

(51) Int. Cl.
H04N 5/445 (2011.01)

(52) U.S. Cl.
USPC ........ 725/40; 725/9; 725/18; 725/19; 725/39; 725/105; 725/109; 725/110; 725/115

(58) Field of Classification Search
USPC .......................................................... 725/40
See application file for complete search history.

(56) References Cited

U.S. PATENT DOCUMENTS

| | | | |
|---|---|---|---|
| 4,739,398 A * | 4/1988 | Thomas et al. ................. | 725/22 |
| 5,751,672 A | 5/1998 | Yankowski | |
| 5,987,525 A | 11/1999 | Roberts et al. | |
| 6,061,680 A | 5/2000 | Scherf et al. | |
| 6,154,773 A | 11/2000 | Roberts et al. | |
| 6,161,132 A | 12/2000 | Roberts et al. | |
| 6,230,192 B1 | 5/2001 | Roberts et al. | |
| 6,230,207 B1 | 5/2001 | Roberts et al. | |
| 6,240,459 B1 | 5/2001 | Roberts et al. | |
| 6,304,523 B1 | 10/2001 | Jones et al. | |
| 6,330,593 B1 | 12/2001 | Roberts et al. | |
| 6,378,035 B1 * | 4/2002 | Parry et al. .................... | 711/110 |
| 6,983,289 B2 | 1/2006 | Commons et al. | |
| 7,012,183 B2 | 3/2006 | Herre et al. | |
| 7,167,857 B2 | 1/2007 | Roberts | |
| 7,228,280 B1 | 6/2007 | Scherf et al. | |
| 7,282,632 B2 | 10/2007 | van Pinxteren et al. | |
| 7,304,231 B2 | 12/2007 | van Pinxteren et al. | |
| 7,308,485 B2 | 12/2007 | Roberts et al. | |
| 7,328,153 B2 | 2/2008 | Wells et al. | |
| 7,345,233 B2 | 3/2008 | van Pinxteren et al. | |
| 7,477,739 B2 | 1/2009 | Haitsma et al. | |
| 7,549,052 B2 | 6/2009 | Haitsma et al. | |
| 7,565,213 B2 | 7/2009 | Dittmar et al. | |
| 2002/0023267 A1 * | 2/2002 | Hoang ............................ | 725/87 |
| 2002/0166128 A1 * | 11/2002 | Ikeda et al. .................... | 725/112 |
| 2003/0028796 A1 * | 2/2003 | Roberts et al. ................ | 713/193 |
| 2003/0086341 A1 * | 5/2003 | Wells et al. ................. | 369/13.56 |
| 2004/0119814 A1 * | 6/2004 | Clisham et al. ............ | 348/14.08 |

(Continued)

Primary Examiner — Nicholas Corbo
(74) Attorney, Agent, or Firm — Miller Patent Services; Jerry A. Miller (57) ABSTRACT

A television receiver device consistent with certain implementations has a display associated with the television receiver device. A filter converts a stream of audio/video content that is to be displayed on the display associated with the television receiver device into a stream of digital audio data. A buffer stores a sample of the digital audio data. A modem transmits the sample of audio data from the buffer to a content identification server and that receives metadata identifying the audio data from the content identification server. A display processor renders at least a portion of the metadata to the display. This abstract is not to be considered limiting, since other embodiments may deviate from the features described in this abstract.

26 Claims, 5 Drawing Sheets

U.S. PATENT DOCUMENTS

| | | | |
|---|---|---|---|
| 2004/0143349 A1* | 7/2004 | Roberts et al. | 700/94 |
| 2005/0086692 A1* | 4/2005 | Dudkiewicz et al. | 725/46 |
| 2005/0273319 A1* | 12/2005 | Dittmar et al. | 704/203 |
| 2007/0143777 A1* | 6/2007 | Wang | 725/18 |
| 2007/0288478 A1* | 12/2007 | DiMaria et al. | 707/10 |
| 2008/0049704 A1* | 2/2008 | Witteman et al. | 370/342 |
| 2008/0187188 A1* | 8/2008 | Beletski et al. | 382/124 |
| 2009/0041418 A1 | 2/2009 | Candelore et al. | |
| 2009/0217320 A1* | 8/2009 | Aldrey | 725/37 |
| 2011/0102684 A1* | 5/2011 | Sugiyama et al. | 348/738 |

* cited by examiner

AUTOMATIC CAPTURE OF DATA FOR ACQUISITION OF METADATA

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Companies such as Gracenote, Inc. are in the content identification business. They have technology that can be used to provide metadata that identifies, for example, songs, artists, albums, etc. from samples of the songs that are sent to their servers. This process is used commercially by numerous manufacturers of hardware and software players such as compact disc (CD) players.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted previously, companies such as Gracenote, Inc. are in the content identification business. They have technology that can be used to provide metadata that identifies, for example, songs, artists, albums, etc. from samples of the songs that are sent to their servers. This process is used commercially by numerous manufacturers of hardware and software players such as compact disc (CD) players. In general, Gracenote's algorithms for content (i.e., music) identification that runs on their content identification servers require a sample of six seconds of PCM audio. Accordingly, this example will be used throughout, but should not be considered limiting since other algorithms may be devised that use a shorter or longer sample.

In order to use this technology with a television, to identify a song within a television program, one can capture six seconds of audio and send the audio to the content identification server. However, this results in a delay which may be undesirable to some users. This problem can be overcome in the TV device by continuously capturing the audio (or video data) and sending the data to a content identification server to acquire the metadata of content being played.

It will be appreciated that while the present example depicts capturing audio data for identification of a song, similar processes can be carried out by capture of video, audio/video (A/V) or other content without limitation.

In certain instances, when a song is playing during a TV program, the viewer may wish to find out information about the song. Unfortunately, using known technology, the user cannot currently find the music metadata unless it form a part of the TV program so that the metadata is shown on the screen as part of the TV program. While the metadata could be inserted into the television program's video signal, this requires modification for both receiver side and transmission side.

In accord with certain implementations consistent with the present invention, while the TV plays audio or video, it also continuously captures the audio or video data and sends a sample of the data to a content identification server in order to to acquire the metadata of content being played. Since the metadata is being acquired from server continuously (or on user demand) the device can show the metadata on the TV display.

Instead of sending the data to server continuously, the television device can hold the data using a circular buffer so that when user initiates acquisition of the metadata at any time and the most recent six seconds of valid audio will be sent. The TV device already has the music sample data and can send the sample data to the server immediately rather than having to first capture the data and then send the data to the content identification server and encounter undesirable delays. This speeds up the process by at least about six seconds according to present sample requirements.

Hence, in one example process: 1. The TV decodes and displays a TV shows which are received over a digital channel. 2. While TV decodes the digital video and audio, it captures decoded audio data, which may be pulse code modulated (PCM) data. 3. Once the TV captures six seconds of audio, a check can be performed to see if the six second sample is valid audio, and if so, send the data to a content identification server—in this case, a music identification server. 4. If the metadata which was received from music identification server was valid, then the TV can show the metadata on the screen so that the music is identified to the user. 5. Add the song metadata into database with current TV program data. 6. User launches song history, and is able to see all song history with related TV program data.

Figure 1:
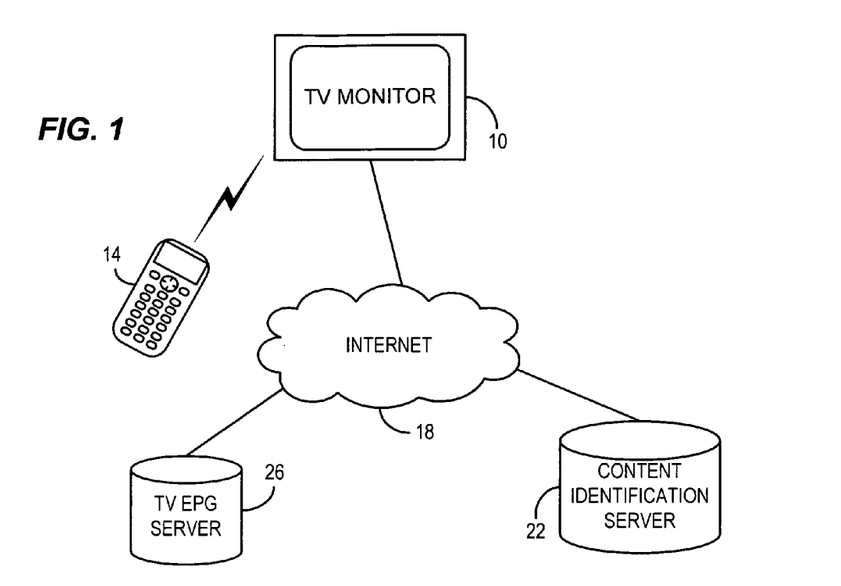
FIG. 1 is an example system diagram of an example TV system consistent with certain embodiments of the present invention.

FIG. 1 is an example system diagram of an example TV system consistent with certain embodiments of the present invention. The system includes a TV monitor 10 that displays TV programs in a more or less conventional manner under control by the user generally using a remote controller 14. In order to obtain access to the functionality discussed herein, the TV monitor (or other connected receiver such as a TV set top box or other Internet enabled appliance) is connected via the Internet 18 to a Content Identification Server 22 such as those available commercially from content identification services such as Gracenote as previously discussed. The Internet connection can also be used by the TV receiver system to obtain electronic program guide (EPG) data from an online EPG server such as 26.

Figure 2:
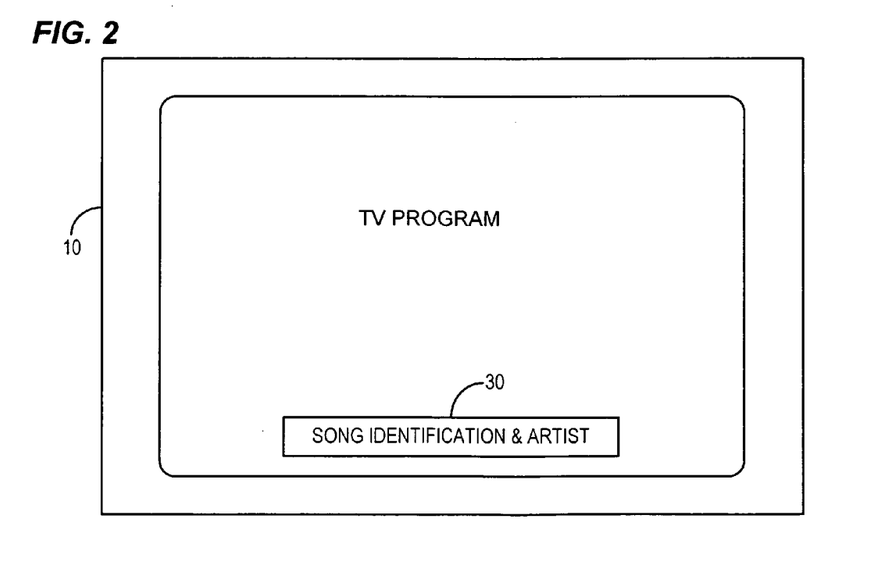
FIG. 2 depicts an example TV display consistent with certain embodiments of the present invention.

As described above, when the metadata for a particular song that is playing on the TV is identified, it can be displayed on the TV monitor 10 as depicted in FIG. 2. As shown, the TV program plays normally, and the metadata in the form of song title and artist is displayed as overlay graphics 30. Any other form of display of the metadata can be used including transparent windows and the like, and other metadata including album and further artist information or album graphics can be utilized. It will be understood that the illustration of FIG. 2 is merely intended as one illustration of the possibilities and not intended to be limiting.

Figure 3:
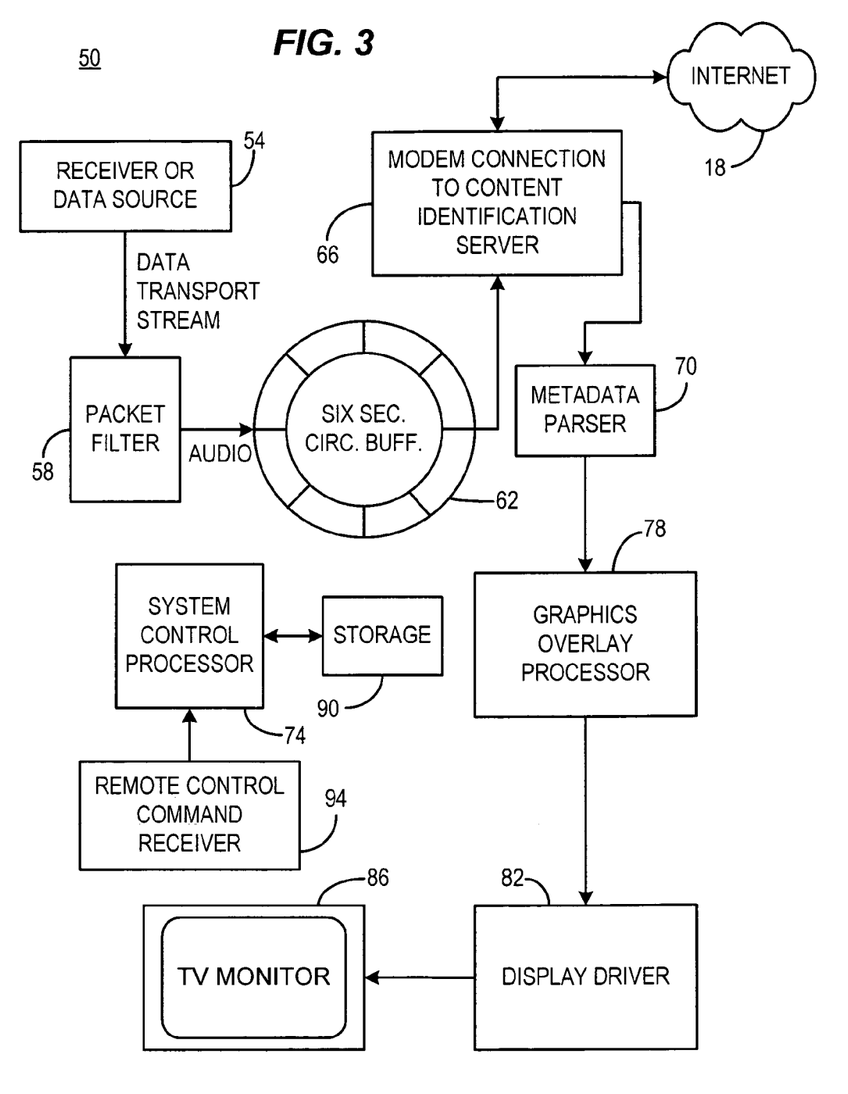
FIG. 3 is an example block diagram of a TV receiver device consistent with certain embodiments of the present invention.

FIG. 3 is an example partial block diagram of a TV receiver device 50 consistent with certain embodiments of the present invention, wherein only the functional blocks used to implement the present functionality is depicted. In this example, a receiver 54 or other data source or data interface (e.g., an Internet interface) receives digital A/V content from a source such as a cable network, satellite network, Telco, broadcaster or via the Internet and produces an output data transport stream carrying packetized audio, video and support data (e.g., PSIP data and the like). These packets are filtered (e.g., by packet identifier) and stripped of all packet overhead using a packet filter 58 in order to produce a qualified stream of compressed PCM audio data (e.g., using SDK compression or other standard specified by the content identification service) suitable for use by the content identification server. Such format is specified by the content identification service so as to standardize the data received for identification.

In accord with certain embodiments, this audio data can be continuously stored in a six second (or other suitable time) circular buffer 62 that permits the data to be immediately accessed for transmission to the content identification server 22 via modem 66 that is provided with a URI suitable for access to the server 22 via Internet 18. The content identification server 22 returns metadata if it can identify the song and this metadata are parsed in a metadata parser 70, which may operate as a process running on the system control processor 74. The parsed metadata can then be passed to a graphics overlay processor 78 for rendering to display driver 82 and TV monitor display 86.

The entire system operates under control of the system control processor 74 which has associated storage (RAM, ROM, etc.) 90, with control processor 74 interfacing with each functional block as required and receiving commands from remote controller 14 via remote control command receiver 94 in any suitable manner.

While this depiction shows storage of six seconds of audio, this is because a six second sample is used by Gracenote, Inc. for song recognition and is therefore shown in the example depicted above. But in general the sample should be long enough for recognition by any suitable content identification service. Further, the present concept can be extended to storage of a sample of video that is long enough for the video to be identified by content identification server 22, and for the system to then access EPG server 26 to obtain additional information regarding video information via video metadata. Other variations will occur to those skilled in the art upon consideration of the present teachings.

Figure 4:
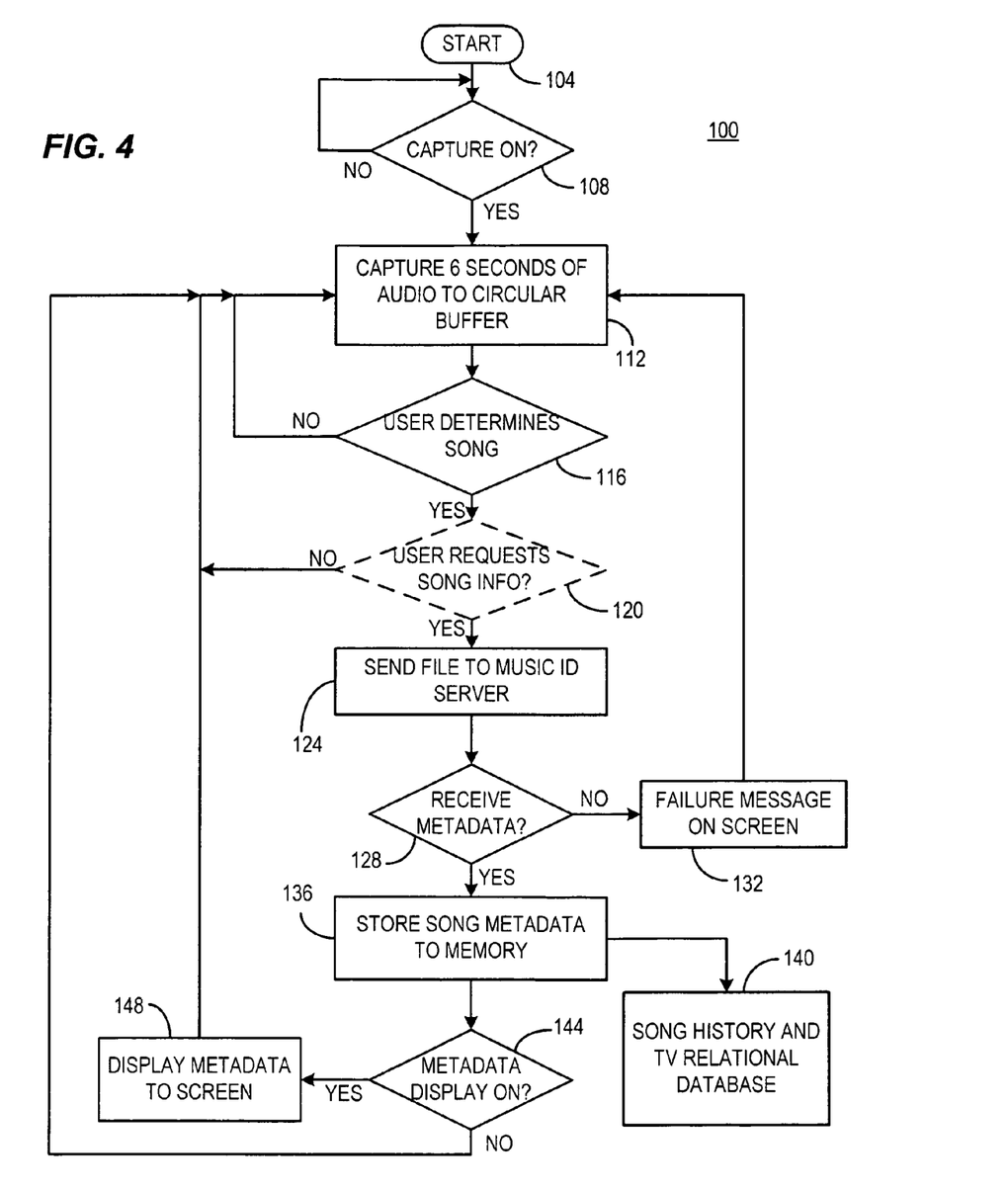
FIG. 4 is a flow chart of an example process consistent with certain embodiments of the present invention.

FIG. 4 is a flow chart of a first example process 100 consistent with certain embodiments of the present invention starting at 104 after which the system determines if the audio capture feature described is turned on at 108. If not, the remainder of the process can be defeated until the feature is turned on. If the capture feature is turned on at 108, the circular buffer begins capturing audio at 112 and continuously updates the audio so that at least six seconds (for the Gracenote implementation) of audio is always available. If the user determines that there is a song of interest playing as the audio at 116, then he or she may wish to identify the song.

Once the buffer has six seconds of music data stored, a request can be made to the server at 124 to identify the song. This can occur in one embodiment as a result of a user request at 120 (shown in dashed lines to indicate that it is optional), or as a matter of course wherein the server query can be carried out using any other mechanism (for example, a time criteria of every 90 seconds or so). The request at 124 can include conversion of the six seconds of audio into a smaller sized file representing a signature of the music sample that is used to identify the music.

If the content identification server is unable to identify the content and sends a failure notice instead of metadata at 128, a failure message may be briefly presented as a screen overlay at 132. However, if metadata are received at 128, the song metadata may be stored to memory at 136. In certain implementations, the song metadata can be added to a database with or without current TV program data. In certain implementations, the song metadata can also be added to a song history list so that the user can launch a song history list command, and thereby retrieve from memory a list of songs identified with or without related TV program data. The storage as a database or list is depicted as 140 and this data are then accessible by user command either directly from a remote control or from a TV menu system such as a cross-media bar menu system.

If an option of display of the metadata is turned on at 144, the parsed metadata can be displayed to an overlay window or otherwise on the TV screen at 148 so that the user can identify relevant information about the song such as title, artist, author, album, etc. or even display an icon obtained from the content identification database representing album graphics. Other variations will occur to those skilled in the art upon consideration of the present teachings.

Figure 5:
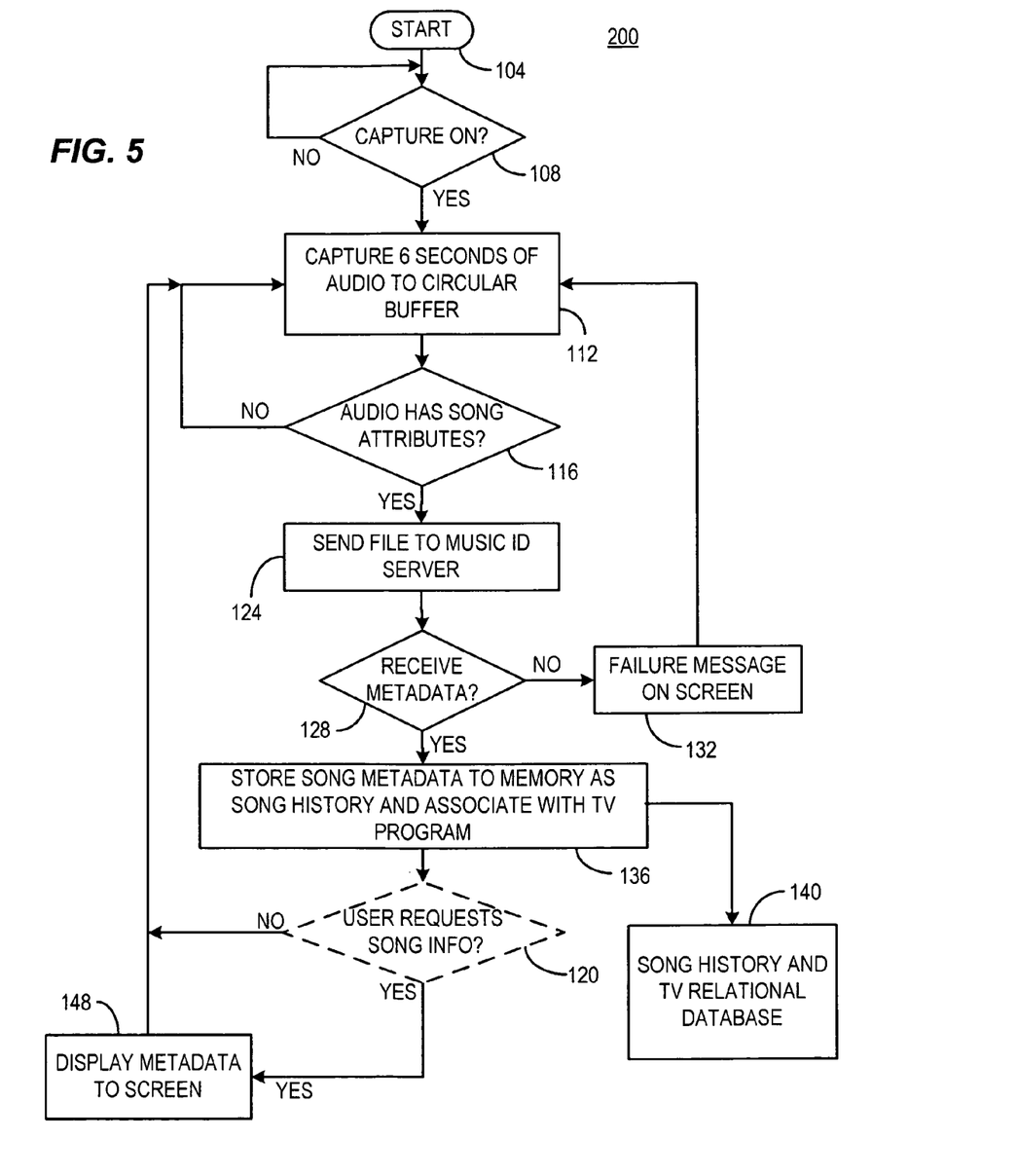
FIG. 5 is another flow chart of another example process consistent with certain embodiments of the present invention.

FIG. 5 shows one such variation with all operations being essentially the same as described in connection with FIG. 4. However, in this example, when a sample is identified by the system as having song attributes, the system requests the metadata without user prompting. Again, this could be carried out on a periodic basis or whenever a song is determined to be playing because the sample has song attributes. In this example, however, the metadata are already stored in memory and is not displayed until the user requests song info at 120. The information, in this case, can often be displayed immediately since it will have been previously requested and received. In a further variant, 120 can be omitted as indicated by the broken lines and any time a song is identified its metadata can be displayed.

Figure 6:
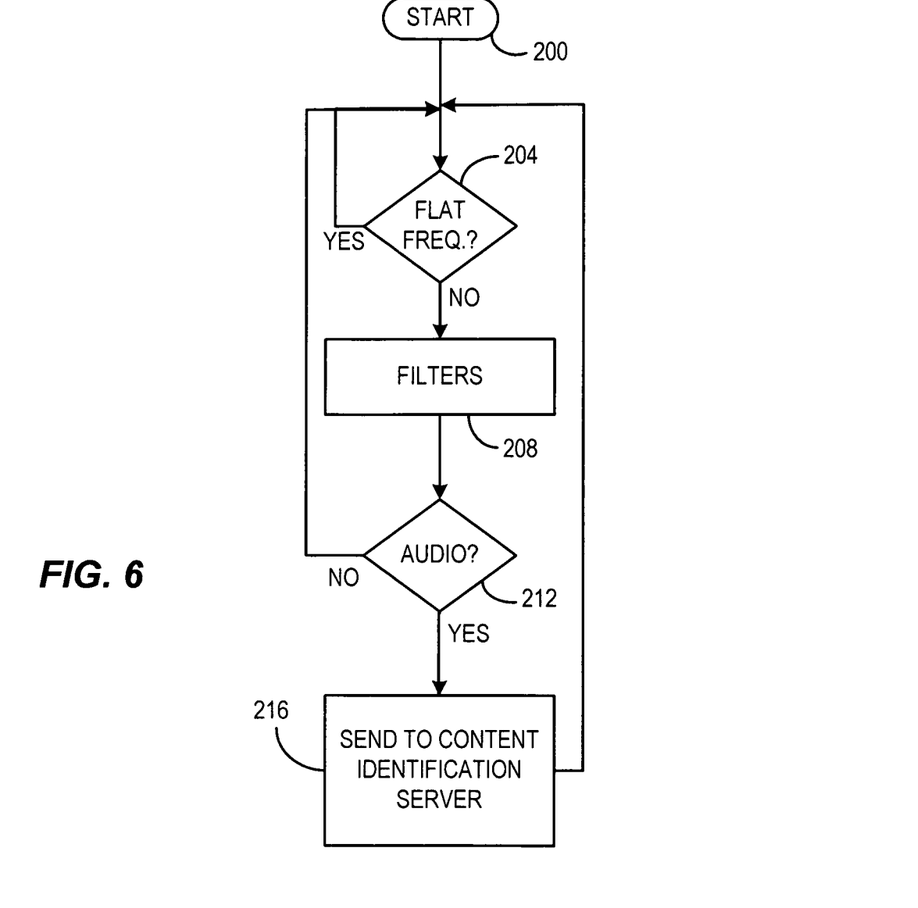
FIG. 6 is another flow chart of an example process for determining if audio contains music attributes consistent with certain embodiments of the present invention.

The analysis of the song to determine if it has song attributes is preferably done at the audio decoder level and possibly using hardware acceleration. This can be accomplished in a number of ways. One example is depicted in FIG. 6 starting at 200 where first the audio stream is tested to see if it is a flat frequency signal at 204, which may be a monotone or a pretty much silent stream. If so, the audio is unlikely to be a song and/or is unsuitable to produce a signature and control returns to 204 for the next analysis. If the audio stream passes the test, the audio stream passed through a set of filters at 208. One such filter will be similar and repetitive frequencies as such frequencies often resembling noise in the TV program or commercial are detected. Another such filter is a set of frequencies corresponding to normal conversational human speech, which represents a typical news reporting situation. If after such filtering at 208 the resultant audio stream is still not pretty much flat in frequency response (i.e., it has distinct high and low frequencies), it is relatively certain that there is music in the audio stream at 212. The original audio stream (or its compressed signature) can then be sent to the content identification server at 216. Also, it is noted that since content identification is user-initiated, one can expect that the past 6 sec of audio stream has something worth identifying, and hence send it up to the content identification server without a music check. The server will merely return a negative result if the audio stream is not a recognized as piece of music.

Also, in order to conserve memory space and have the option of storing more copies of past audio streams so that users can access beyond the past 6 seconds (e.g., access audio streams 30 sec earlier), the audio streams can be compressed into signature files which the content identification server recognizes and expects. The corresponding audio information can be tagged (as to whether it is a song and the time stamp (to the signature files.) Thus, a television receiver device consistent with certain embodiments has a display associated with the television receiver device. A filter converts a stream of audio/video content that is to be displayed on the display associated with the television receiver device into a stream of PCM digital audio data, wherein the filter separates the audio from audio video content by use of packet identifiers to separate audio packets from other packets and produces the stream of digital audio data by removing packet overhead from the audio packets. A circular buffer stores a sample of approximately six seconds in duration of the digital audio data. A modem transmits the sample of audio data from the buffer to a content identification server and that receives metadata identifying the audio data from the content identification server. A storage device stores the metadata to a database or history list. A metadata parser selects predefined elements of metadata from the metadata for display on the display. A graphics overlay processor generates a graphics overlay containing the metadata. Either the sample of audio data is sent to the content identification server upon receipt of a user command from a remote control or the metadata is rendered to the display upon receipt of a user command from a remote control.

Another television receiver device has a display associated with the television receiver device. A filter converts a stream of audio/video content that is to be displayed on the display associated with the television receiver device into a stream of digital audio data. A buffer stores a sample of the digital audio data. A modem transmits the sample of audio data from the buffer to a content identification server and that receives metadata identifying the audio data from the content identification server. A display processor renders at least a portion of the metadata to the display.

In certain implementations, the digital audio data comprises Pulse Code Modulated (PCM) audio data. In certain implementations, the buffer comprises a circular buffer that continuously stores a defined quantity of audio data. In certain implementations, the defined quantity of audio data comprises approximately six seconds of audio. In certain implementations, the filter separates the audio from audio video content by use of packet identifiers to separate audio packets from other packets and produces the stream of digital audio data by removing packet overhead from the audio packets. In certain implementations, a metadata parser selects predefined elements of metadata from the metadata for display on the display. In certain implementations, the display processor comprises a graphics overlay processor that generates a graphics overlay containing the metadata. In certain implementations, the sample of audio data is sent to the content identification server upon receipt of a user command from a remote control. In certain implementations, the metadata is rendered to the display upon receipt of a user command from a remote control. In certain implementations, the metadata are stored to a database or history list on a storage device.

A television receiver device consistent with certain implementations has a display associated with the television receiver device. A filter converts a stream of audio/video content that is to be displayed on the display associated with the television receiver device into a stream of digital content of a specified category. A buffer stores a sample of the digital content. A modem transmits the sample of digital content from the buffer to a content identification server and that receives metadata identifying the digital content from the content identification server. A display processor renders at least a portion of the metadata to the display.

In certain implementations, the content comprises video content data. In certain implementations, the buffer comprises a circular buffer that continuously stores a defined quantity of the content. In certain implementations, the filter separates the specified category of content by use of packet identifiers to separate the specified category of content from other packets and produces the stream of digital content by removing packet overhead from packets of the specified category. In certain implementations, a metadata parser selects predefined elements of metadata from the metadata for display on the display. In certain implementations, the display processor comprises a graphics overlay processor that generates a graphics overlay containing the metadata. In certain implementations, the sample of content is sent to the content identification server upon receipt of a user command from a remote control. In certain implementations, the metadata is rendered to the display upon receipt of a user command from a remote control. In certain implementations, the metadata are stored to a database or history list on a storage device.

A method of rendering content metadata to a display associated with a television receiver device in a manner consistent with certain embodiments involves providing a display associated with the television receiver device; converting a stream of audio/video content that is to be displayed on the display associated with the television receiver device into a stream of digital audio data; buffering a sample of the digital audio data in a buffer storage device; transmitting the sample of audio data from the buffer to a content identification server; receiving metadata identifying the audio data from the content identification server; and rendering at least a portion of the metadata to the display.

In certain implementations, the digital audio data comprises Pulse Code Modulated (PCM) audio data. In certain implementations, the buffering is carried out in a circular buffer that continuously stores a defined quantity of audio data. In certain implementations, the defined quantity of audio data comprises approximately six seconds of audio. In certain implementations, the filtering separates the audio from audio video content by use of packet identifiers to separate audio packets from other packets and produces the stream of digital audio data by removing packet overhead from the audio packets. In certain implementations, the method further involves parsing the metadata to select predefined elements of metadata from the metadata for display on the display. In certain implementations, the predefined elements of metadata are rendered to the display using a graphics overlay processor that generates a graphics overlay containing the metadata. In certain implementations, the sample of audio data is sent to the content identification server upon receipt of a user command from a remote control. In certain implementations, the metadata is rendered to the display upon receipt of a user command from a remote control. In certain implementations, the method further involves storing the metadata to a database or history list on a storage device. In certain implementations, prior to transmitting a determination can be made as to whether the audio sample has song attributes.

Any of the above methods can be carried out using a tangible computer readable electronic storage medium storing instructions which, when executed on one or more programmed processors, carry out the method.

It is noted that while the above examples have focused on the identification of music within a television program, the same type of technology could be readily modified to sample and identify video or text or other types of content.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Certain embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television receiver device, comprising:
a television display forming a part of the television receiver device;
a filter forming a part of the television receiver device that converts a stream of audio/video content that is to be displayed on the display associated with the television receiver device into a stream of PCM digital audio data, where the filter separates the audio from audio video content by use of packet identifiers to separate audio packets from other packets and produces the stream of digital audio data by removing packet overhead from the audio packets;
a circular buffer forming a part of the television receiver device that stores a sample of a predetermined duration of the stream of PCM digital audio data;
a modem forming a part of the television receiver device that transmits the sample of PCM digital audio data from the buffer to a content identification server and that receives metadata identifying the audio data from the content identification server;
where the predetermined duration is at least as long as a time required by the content identification server to identify content;
a storage device forming a part of the television receiver device, where the metadata are stored to a database or history list on the storage device;
a metadata parser forming a part of the television receiver device that selects predefined elements of metadata from the metadata for display on the display;
a graphics overlay processor forming a part of the television receiver device that generates a graphics overlay containing the metadata; and
where the sample of PCM digital audio data is sent to the content identification server upon receipt of a first user command from a remote control and the metadata is rendered to the display upon receipt of a second user command from the remote control.

2. A television receiver device, comprising:
a display associated with the television receiver device;
a filter forming a part of the television receiver device that is configured to convert a stream of audio/video content that is to be displayed on the display associated with the television receiver device into a stream of digital audio data, wherein the filter is configured to separate the audio from audio video content by use of packet identifiers to separate audio packets from other packets and is further configured to produce the stream of digital audio data by removing packet overhead from the audio packets;
a circular buffer forming a part of the television receiver device that that is configured to store a sample of the digital audio data;
a modem forming a part of the television receiver device that is configured to transmit the sample of digital audio data from the buffer to a content identification server and that is further configured to receive metadata identifying the audio data from the content identification server;
a metadata parser forming a part of the television receiver device that is configured to select predefined elements of metadata from the metadata for display on the display; and
a display processor forming a part of the television receiver device that is configured to render at least a portion of the metadata to the display.

3. The television receiver device according to claim 2, where the digital audio data comprises Pulse Code Modulated (PCM) audio data.

4. The television receiver device according to claim 2, where the circular buffer is configured to continuously store a defined quantity of digital audio data that is at least as large as required by the content identification server.

5. The television receiver device according to claim 4, where the defined quantity of digital audio data comprises at least six seconds of audio.

6. The television receiver according to claim 2, where the display processor comprises a graphics overlay processor that is configured to generate a graphics overlay containing at least a portion of the metadata.

7. The television receiver according to claim 2, further comprising a control processor configured to cause the sample of digital audio data is sent to the content identification server upon receipt of a user command at the television receiver device from a remote control.

8. The television receiver according to claim 2, where the display processor is configured to render the metadata to the display upon receipt of a user command from a remote control.

9. The television receiver according to claim 2, where the metadata are stored to a database or history list on a storage device coupled to the television receiver device.

10. A television receiver device, comprising:
a display associated with the television receiver device;
a filter forming a part of the television receiver device that is configured to convert a stream of audio/video content that is to be displayed on the display associated with the television receiver device into a stream of digital content of a specified category, wherein the filter is configured to separate the specified category of digital content by use of packet identifiers to separate the specified category of digital content from other packets and is further configured to produce the stream of digital content by removing packet overhead from packets of the specified category;
a circular buffer forming a part of the television receiver device that is configured to store a sample of the digital content;
a modem forming a part of the television receiver device that is configured to transmit the sample of digital content from the buffer to a content identification server and that is further configured to receive metadata identifying the digital content from the content identification server;
a metadata parser that is configured to select predefined elements of metadata from the metadata for display on the display; and
a display processor forming a part of the television receiver device that is configured to render at least a portion of the metadata to the display.

11. The television receiver device according to claim 10, where the digital content comprises video content data.

12. The television receiver device according to claim 10, where the circular buffer is configured to continuously store a defined quantity of the digital content.

13. The television receiver according to claim 10, where the display processor comprises a graphics overlay processor that is configured to generate a graphics overlay containing the metadata.

14. The television receiver according to claim 10, further comprising a control processor configured to cause the sample of digital content to be sent to the content identification server upon receipt of a user command from a remote control.

15. The television receiver according to claim 10, where the display processor is configured to render the metadata to the display upon receipt of a user command from a remote control.

16. The television receiver according to claim 10, where the metadata are stored to a database or history list on a storage device forming a part of the television receiver device.

17. A method of rendering content metadata to a display associated with a television receiver device, comprising:

providing a display associated with the television receiver device;

at the television receiver device, converting a stream of audio/video content that is to be displayed on the display associated with the television receiver device into a stream of digital audio data, wherein the filtering separates the digital audio data from audio video content by use of packet identifiers to separate digital audio data packets from other packets and produces the stream of digital audio data by removing packet overhead from the digital audio data packets;

at the television receiver device, buffering a sample of the digital audio data in a circular buffer storage device;

at the television receiver device, transmitting the sample of digital audio data from the circular buffer storage device to a content identification server;

at the television receiver device, receiving metadata identifying the digital audio data from the content identification server;

at the television receiver device, parsing the metadata to select predefined elements of metadata from the metadata for display on the display; and at the television receiver device, rendering at least a portion of the metadata to the display.

18. The method according to claim 17, where the digital audio data comprises Pulse Code Modulated (PCM) audio data.

19. The method according to claim 17, where the circular buffer continuously stores a defined quantity of digital audio data.

20. The method according to claim 19, where the defined quantity of digital audio data comprises at least six seconds of audio.

21. The method according to claim 17, where the predefined elements of metadata are rendered to the display using a graphics overlay processor that generates a graphics overlay containing the metadata.

22. The method according to claim 17, where the sample of digital audio data is sent to the content identification server upon receipt of a user command from a remote control.

23. The method according to claim 17, where the metadata is rendered to the display upon receipt of a user command from a remote control.

24. The method according to claim 17, further comprising storing the metadata to a database or history list on a storage device forming part of the television receiver device.

25. The method according to claim 17, further comprising determining if the digital audio data has song attributes prior to the transmitting.

26. A non-transitory tangible computer readable electronic storage medium storing instructions which, when executed on one or more programmed processors, carry out a method according to claim 17.

* * * * *